United States Patent [19]

Zebleckis

[11] Patent Number: 4,916,852
[45] Date of Patent: Apr. 17, 1990

[54] COVER FOR A FISHING ROD

[75] Inventor: Richard Zebleckis, 8652 S. 86th Ave., Justice, Ill. 60458

[73] Assignees: Richard Zebleckis; Richard E. Quradnik, both of Glen Ellyn, Ill.

[21] Appl. No.: 345,023

[22] Filed: Apr. 28, 1989

[51] Int. Cl.⁴ .............................................. A01K 97/08
[52] U.S. Cl. ........................................ 43/26; 43/54.1; 206/315.11; 224/922
[58] Field of Search .................... 43/26, 54.1; 206/315.11; 224/922; 150/154

[56] References Cited

U.S. PATENT DOCUMENTS

| | | | |
|---|---|---|---|
| 679,422 | 7/1901 | Heritage | 43/26 |
| 764,398 | 7/1904 | Upton . | |
| 1,903,798 | 4/1933 | Turner | 43/26 |
| 1,986,256 | 1/1935 | Ellis . | |
| 2,197,977 | 4/1940 | Halpin . | |
| 2,473,977 | 6/1949 | Tutton | 224/922 |
| 2,591,674 | 4/1952 | Chalker | 43/26 |
| 2,595,746 | 5/1952 | Zinn | 43/26 |
| 2,618,880 | 11/1952 | Sourek . | |
| 2,723,482 | 11/1955 | Marten | 43/26 |
| 2,869,277 | 1/1959 | Breithaupt . | |
| 3,033,259 | 5/1962 | Landis | 206/315.11 |
| 3,131,503 | 5/1964 | Gottula . | |
| 3,540,508 | 11/1970 | Couch . | |
| 3,568,354 | 3/1971 | Yacko . | |
| 3,624,948 | 12/1971 | De Baker, Sr. . | |
| 3,632,714 | 1/1972 | Fairbanks . | |
| 3,674,190 | 7/1972 | Wright . | |
| 3,972,144 | 8/1976 | Geisler . | |
| 4,136,478 | 1/1979 | Wycosky . | |
| 4,222,193 | 9/1980 | Beck . | |
| 4,530,178 | 7/1985 | Rauscher | 43/54.1 |

FOREIGN PATENT DOCUMENTS 1419803 10/1965 France .................................. 43/26

OTHER PUBLICATIONS 4-page flier by Western Filament, Inc.

Primary Examiner—Kurt Rowan
Attorney, Agent, or Firm—Hill, Van Santen, Steadman & Simpson

[57] ABSTRACT

There is disclosed herein a protective cover for a fishing rod which includes a conformable, expandable, elongated and woven plastic sleeve having an open end and a closed end which has been fused together in the flat position. A tag is folded over the top end and a grommet-like member inserted through the top end and tag to form an eyelet for hanging the cover and rod encased therein. A method of forming the protective fishing rod cover is disclosed. This type of cover is suitable for covering a rod to be used when selected for use and for storing said rod. A hook is secured to the tag so as to grasp the cover and permit storage in a rolled and closed configuration.

4 Claims, 1 Drawing Sheet

U.S. Patent  Apr. 17, 1990  4,916,852
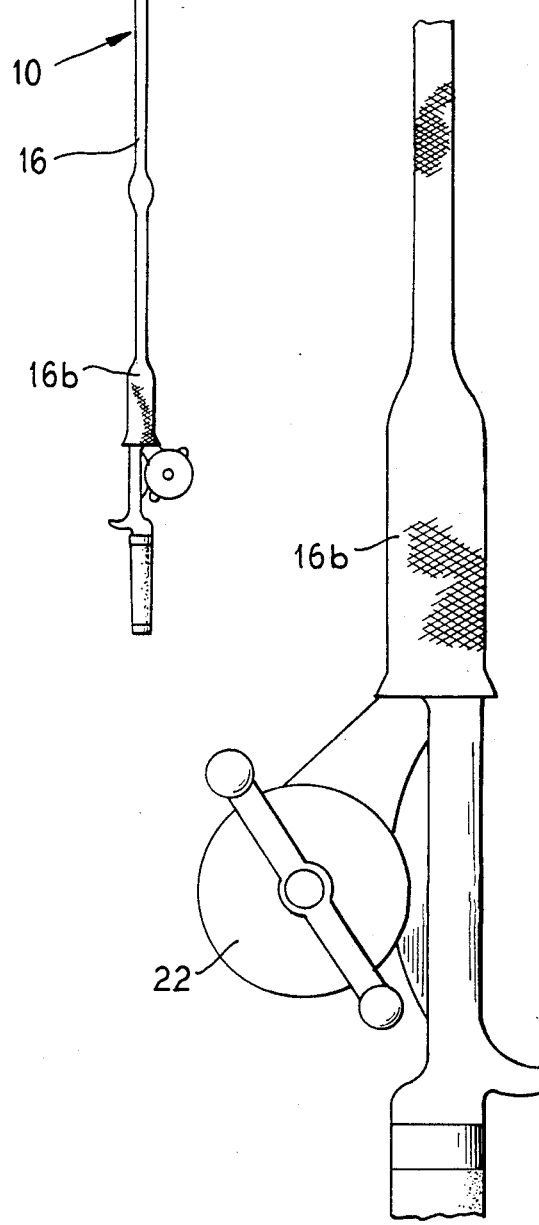
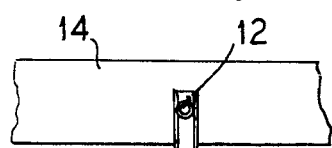
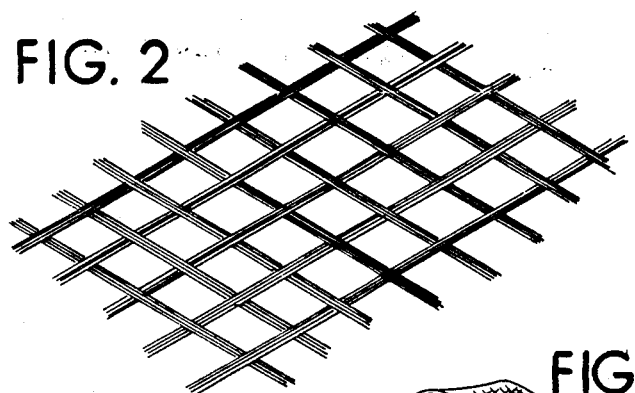
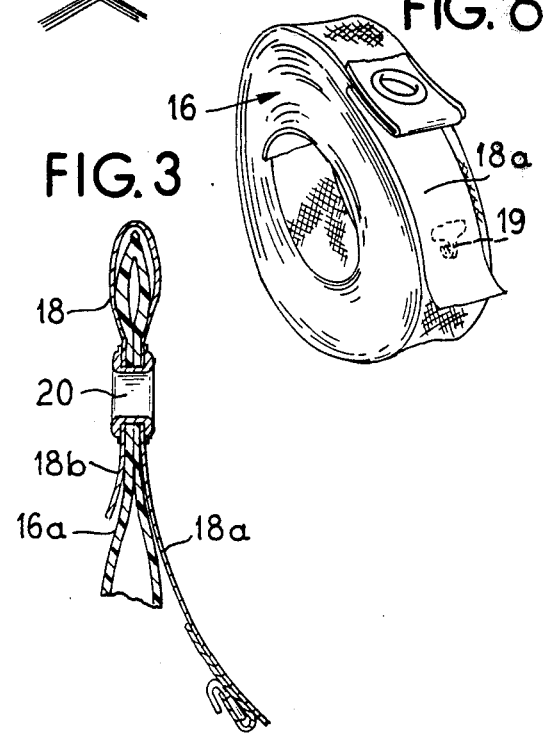
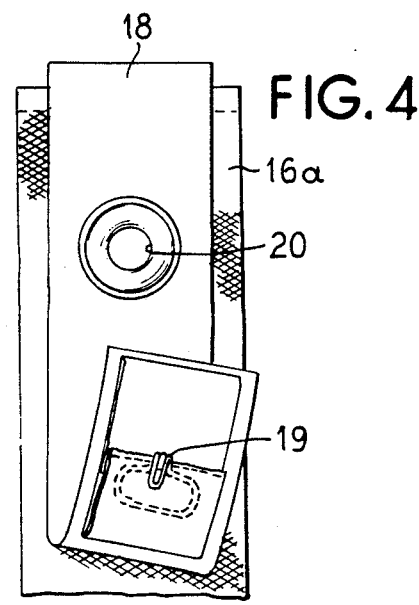

COVER FOR A FISHING ROD

BACKGROUND OF THE INVENTION

This invention relates to a protective sleeve for a fishing rod and reel, and more specifically, to an expandable and conformable sleeve with an improved top end construction, which can be used in storing a fishing rod.

When fishing, a fisherman may take with him and use a number of different rods and/or reels. These may be placed or set down in a boat in a group for individual use when desired. It is desirable to keep the rods separated so as to avoid tangling hooks, lines, etc., together and to assure quick and easy access to a given rod.

Moreover, when the fishing trip is completed, it is desirable to store the rods and reels in a manner that permits easy retrieval for the next trip. During storage it is also desirable to minimize the risk of tangling the lines, etc. This is usually accomplished by hanging of the rod.

There are a number of devices that can achieve one or more of these goals, which include plastic tubes, cloth or leather cases, or an expandable plastic sleeve. For the latter, see U.S. Pat. No. 4,222,193. Other devices are shown in one or more of the U.S. Pat. Nos. cited in 4,222,193. Specifically, see Nos. 764,398; 1,986,256; 2,197,977; 2,595,746; 2,618,880; 2,723,482; 2,869,277; 3,131,503; 3,540,508; 3,568,354; 3,624,948; 3,632,714, 3,674,190; 3,972,144; and 4,136,478. These each have disadvantages relating to water retention, soaking, being cumbersome, storage, etc.

However, it has been found to be desirable to provide a less expensive, more easily manufactured device, easily used, and easily stored cover.

It is therefore a primary object of this invention to provide a protective and hangable sleeve for a fishing rod which can be readily manufactured, used and stored.

These and other objects of this invention will become apparent from the following description and appended claims.

SUMMARY OF THE INVENTION

There is provided by this invention a cover or sleeve for a fishing rod for protecting and storing the rod and which is comparatively inexpensive and easy to manufacture.

The cover of this invention is made of a length of flexible, open weave, conformable and expandable sleeving or tubing. The tubing is of the type commonly referred to as a "Chinese puzzle", which reduces in diameter when the tubing is stretched. The tubing is cut and heat-sealed or fused at one end which forms the top. Then a name tag is applied over the top end to finish the end. A grommet-like member is inserted through the top end and tag for use in hanging the rod. A hook is provided on the tag to secure to the cover when the cover is rolled for storage.

The bottom end of the tube is left open and can be folded (i.e., hemmed or cuffed) so as to adjust the length of the sleeve.

BRIEF DESCRIPTION OF THE DRAWINGS

FIG. 1 is a perspective view of a sleeve which encases a fishing rod and which is hung on a hanger;

FIG. 2 is an enlarged view of the surface of the material for the sleeve;

FIG. 3 is a sectional view of the sleeve at the top end thereof showing the sealed end, tag, hanger grommet and hook;

FIG. 4 is an elevational view of the top end of the sleeve;

FIG. 5 is an elevational view of the bottom end of a rod and reel with the reel uncovered;

FIG. 6 is a perspective view of a cover that has been rolled for storage and hooked closed; and FIG. 7 is a schematic block diagrammatic view showing in block diagram style a method for making the fishing rod cover of this invention.

DESCRIPTION OF THE PREFERRED EMBODIMENT

Referring now to the drawings, there is shown a covered rod 10 generally, which is suspended at its top end from a hook 12, or the like, in a supporting surface such as 14.

The rod 10 is covered by an elongated plastic sleeve 16. The sleeve is fabricated from an open weave, stretchable and conformable fabric that when stretched reduces in diameter so as to conform to an object therein. This property has caused such material to be commonly referred to as a "Chinese puzzle". One such material is sold by Western Filament, Inc., 4680 San Fernando Road, Glendale, California 91204, under the name Expandable Sleeving. FIG. 2 shows an enlarged view of the nature of the material The material can be purchased as a roll and then cut to the desired length, as described hereinafter, to 6' or longer lengths so as to accommodate a 6' rod or longer without covering the reel. If the cover is longer than needed, the bottom end can be cuffed to provide the correct length. Normally a ¾" diameter sleeve is used which permits the sleeve to cover the circular rings or guides spaced along the length of the rod.

The top end of the cover is formed by first measuring the sleeve to the desired length, then clamping one end (which will be the top end) at that length. Then the tubing is heat-cut so as to sever the sleeve to the predetermined length. Heat is used to aid in cutting the plastic sleeve, and it has been found that the clamped end seals or fuses together under the action of the heat and clamp.

The top end 16a, which has been cut and fused, is finished by applying or folding a tag 18 over the end, and the tag also permits identification of the user or manufacturer.

The tag 18 may have a long outer leg 18a and a short inner leg 18b. Identifying indicia can be placed on the outer surface of the long leg. A hook 19 opens which away from the top end is secured to the inside surface of the long leg 18a for securely hooking the cover material. In other words, the hook secures the top end 16a to the cover body.

A grommet-like member or eyelet 20 is inserted into the top end through the tag and sleeve. The grommet is then turned back on itself or deformed so as to secure it in place and is open from either side.

The bottom end 16b of the sleeve can be cut to length or rolled back upon itself to form a cuff. In FIG. 5 the reel 22 is shown as exposed.

This has proven to produce a useful carrying and storage cover for a fishing rod.

As seen in FIG. 6, the cover has been rolled and it is secured in this closed position by the hook 19 engaging the cover 16, which prevents it from unrolling. This storage shape permits compact storage of the cover when it is not on a fishing rod.

The above-described method for making a fishing rod cover of this invention is shown in block diagram style in FIG. 7 of the drawings.

Although the invention has been described with respect to preferred embodiments, it is not to be so limited as changes and modifications can be made which are within the full intended scope of the invention as defined by the appended claims.

I claim as my invention:

1. A protective cover for a fishing rod comprising:
   an elongated woven and conformable plastic sleeve for encasing a fishing rod having an open bottom end and a fused and closed top end, said open end being shaped and constructed to receive a fishing rod therethrough to be inserted into said cover or withdrawn from said cover;
   a grommet-like member positioned adjacent the top end of the sleeve and extending through said sleeve so as to form an opening for hanging of the cover and a rod therein; and
   wherein said cover includes elongated tag means which are folded so as to overlie said top end and which includes depending leg portions through which said grommet-like member passes so as to secure said tag means to said cover in position to extend across said top end.

2. A cover as in claim 1, wherein said tag includes an outer leg and a hook secured to the leg for securement to the cover and for use in retaining the cover in a rolled storage position.

3. A cover as in claim 2, wherein said material at the top end of said sleeve is fused together in a substantially flat configuration.

4. A method for making an elongated tubular cover for a fishing rod comprising the steps of:
   providing tubularly-shaped sleeve having an open weave, being conformable and of plastic material;
   clamping said material so as to define a predetermined length of material and so as to flatten the sleeve adjacent the end which is to form the top end of the sleeve;
   cutting the sleeve adjacent the clamp at an elevated temperature whereby the clamped end fuses and seals to form the cover top end in the flat condition;
   unclamping the fused material;
   providing a folded tag and positioning the tag over the fused top end so as to extend across the fused end; and
   inserting a grommet-like member through the tag so as to secure the tag to the top end of the cover and through the flattened and fused top end so as to form an eyelet through said top end for hanging a cover with a rod therein.

* * * * *